United States Patent [19]

McDow

[11] Patent Number: 4,856,962
[45] Date of Patent: Aug. 15, 1989

[54] VARIABLE INLET GUIDE VANE

[75] Inventor: Robert W. McDow, North Palm Beach, Fla.

[73] Assignee: United Technologies Corporation, Hartford, Conn.

[21] Appl. No.: 159,802

[22] Filed: Feb. 24, 1988

[51] Int. Cl.⁴ .................................................. F01D 9/02
[52] U.S. Cl. ........................................ 415/115; 415/161
[58] Field of Search ............. 415/115, 116, 117, 151, 415/161

[56] References Cited

U.S. PATENT DOCUMENTS

| | | | |
|---|---|---|---|
| 3,442,493 | 5/1969 | Smith, Jr. ............................. | 415/129 |
| 3,645,645 | 2/1972 | Gammill et al. ..................... | 415/117 |
| 3,723,021 | 3/1973 | Bartholomew ...................... | 415/161 |
| 3,861,822 | 1/1975 | Wanger ................................ | 415/147 |
| 3,887,297 | 6/1975 | Welchek .............................. | 415/161 |
| 4,193,738 | 3/1980 | Landis, Jr. et al. ................. | 415/115 |

FOREIGN PATENT DOCUMENTS

| | | | |
|---|---|---|---|
| 1330332 | 8/1987 | U.S.S.R. .............................. | 415/115 |
| 805015 | 11/1958 | United Kingdom ................ | 415/161 |
| 1384216 | 2/1975 | United Kingdom . | |

Primary Examiner—Robert E. Garrett
Assistant Examiner—John T. Kwon
Attorney, Agent, or Firm—Edward L. Kochey, Jr.

[57] ABSTRACT

Heated inlet guide vane 20 is eccentrically supported by trunnions 22, 24. Heating air 36 passes from opening 42 to recess 50 located in the vane which is shaped to communicate with opening 42 throughout the range of rotation of vane 20.

4 Claims, 2 Drawing Sheets

VARIABLE INLET GUIDE VANE

The Government has rights in this invention pursuant to a contract awarded by the Department of the Army.

TECHNICAL FIELD

The invention relates to inlet guide vanes for aircraft engine compressors and in particular to heated variable vanes.

BACKGROUND OF THE INVENTION

In aircraft gas turbines compressors are used to compress the air entering the gas turbine. For maximum efficiency the airflow entering the upstream end of the compressor must have a precise axial orientation with this orientation determined by the pitch of inlet guide vanes directing the air to the first rotor stages. Since variable operating conditions are encountered it is known to use variable inlet guide vanes which may be rotated around an axis varying the pitch to optimize the particular operating condition.

Under certain flight conditions ice can form on the inlet vanes. When this ice later flakes off, it leads to engine damage. Accordingly, it is known to supply heated air to these vanes when potential icing conditions are encountered so as to avoid ice formation on the vanes. Heated air from a high pressure compressor stage is supplied to the vanes for this purpose. Conventionally, this air will enter through the trunnion supporting the variable vane.

The trunnion is normally limited to the width of the blade particularly where it must be installed close to a support strut. Such limited size of trunnion limits the flow area available for introducing air into the guide vane. Since the vanes must be rotated through a linkage, additional complications are introduced in combining this operating linkage with an airflow to the central portion of each of the guide vanes.

Some of the guide vanes are located directly behind support struts. It is important for optimum operation that they be located in such a way that a smooth airflow transition occurs between the struts and guide vanes at all operationing conditions.

SUMMARY OF THE INVENTION

An airfoil shaped guide vane has openings therethrough for the passage of heated air and is eccentrically supported from a trunnion on the heated air inlet end. This trunnion is offset on the concave side of the airfoil so that rotation of the airfoil tends to keep the leading edge thereof directly behind any support strut located upstream of the guide vane with respect to compressor airflow.

A button of cylindrical form is interposed between the airfoil and trunnion portions of the guide vane and has a planar suface perpendicular to the axis on the trunnion side. This planar surface has a recess of arcuate shape which is in fluid communication with the airflow openings through the airfoil. An air supply opening located in the outer casing is adjacent to the first trunnion and in fluid communication with the recess. The recess is arcuately elongated so that it is in fluid communication with the air inlet opening throughout the entire operating range.

DESCRIPTION OF THE PREFERRED EMBODIMENT

An inner casing 10 and an outer casing 12 define an annular space through which compressor airflow 14 passes before entering the compressor. Support struts 16 of streamline shape are located around the circumference of sufficient number to provide adequate support.

Figure 1:
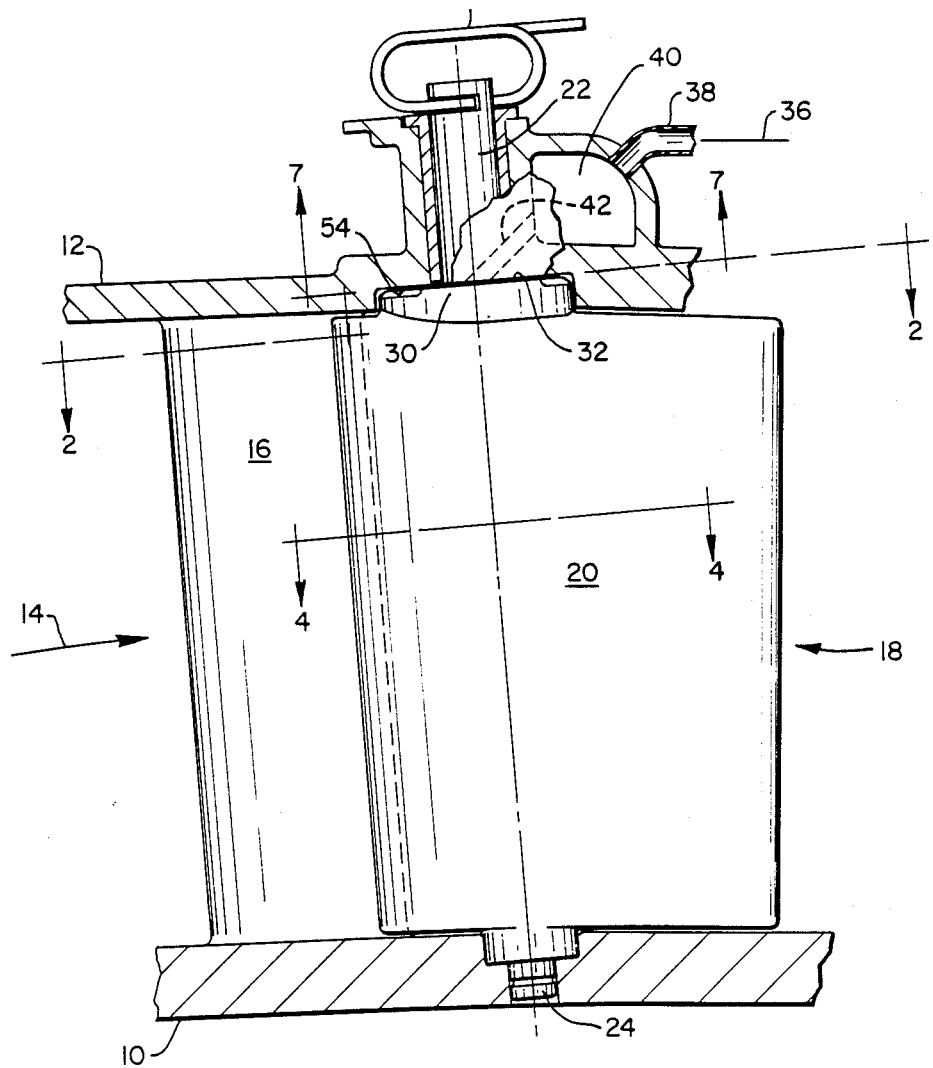
FIG. 1 is a sectional elevation of the guide vane and strut.
Figure 2:
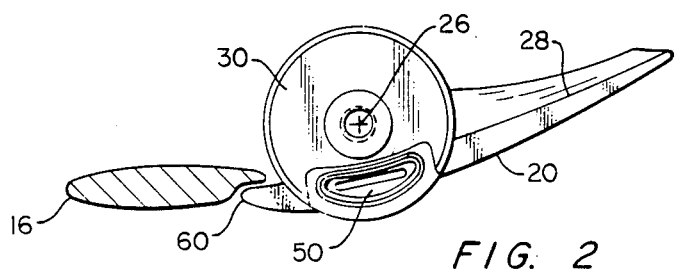
FIG. 2 is a plan section showing the relationship of the strut, airfoil and air inlet through the button.
Figure 3:
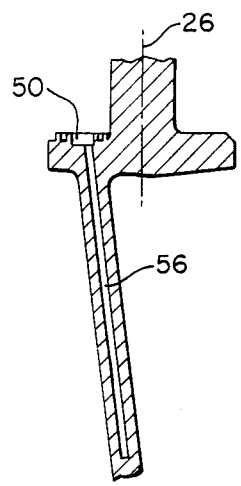
FIG. 3 is an elevation section showing the air entrance to the blade.
Figure 4:
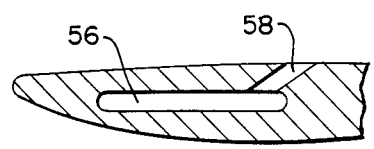
FIG. 4 is a plan section showing the air passage in the blade.
Figure 5:
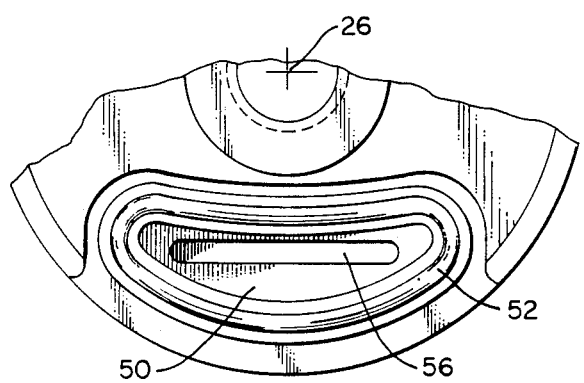
FIG. 5 is a plan view of the recess on the button for receiving air.
Figure 6:
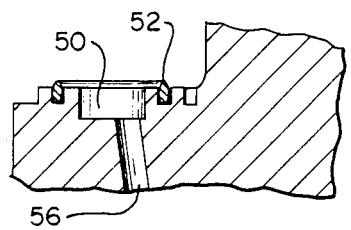
FIG. 6 is a sectional elevation through the recess area.
Figure 7:
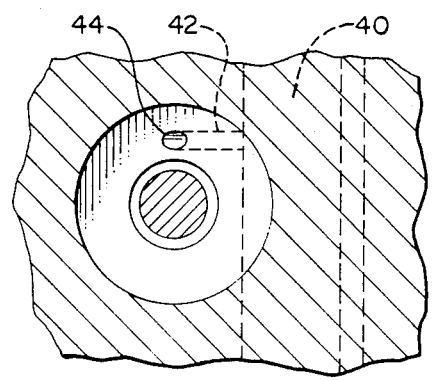
FIG. 7 is a bottom section showing the air supply to the button.

A plurality of guide vane assemblies 18 including airfoil guide vanes 20 are located around this circumference with some of these being located directly behind the inlet struts 16. Each guide vane is rotatably supported on an upper trunnion 22 and a lower trunnion 24 being rotatable around the axis 26 of the trunnions. As best seen in FIG. 2, the axis 26 of the trunnion is offset from the guide vane 20 on the concave side 28.

A cylindrical button 30 is interposed between the first trunnion 22 and the airfoil 20 with this button being substantially cylindrical in shape and having a planar surface 32 facing toward trunnion 22 and being perpendicular to axis 26

The plurality of trunnions 22 are each engaged by link 34 with these links being ganged together to permit a plurality of guide vane assemblies 18 to be rotated together to the appropriate angle.

A controllable supply of heating air 36 passes through inlet conduit 38 into plenum 40. From this point it passes through opening 42 to the opening outlet 44 which is located immediately adjacent to surface 32 of button 30.

A recess 50 is located on the upper surface 32 of the button. This recess is arcuately elongated so that opening 44 remains in fluid communication with the recess throughout the rotatable range of guide vane assembly 18. A seal 52 is in sealing contact with surface 54 of the casing to provide sealing of the airflow volume within the recess.

Within the airfoil vane is an elongated slot 56 in fluid communication with recess 50 and having airflow outlets 58 to permit the passage of the heated air through the vanes with it being discharged to the main airflow to the compressor. This provides the appropriate airflow path to pass heated air through the vanes for the purpose of avoiding ice build up thereon.

It can be seen by FIG. 2 that airfoil 20 is located directly behind strut 16 so as to provide a smooth transition of airflow between the strut and airflow. With the offset center of rotation around axis 26 the leading edge 60 of the airfoil tends to remain effectively immediately downstream of the strut 16. It is also noted that the offset location permits a substantially sized button 30 to be used without interfering with strut 16 during installation. This also permits a larger trunnion 22 to be used providing stronger support if required.

Since the heating airflow to the vane does not pass through trunnion 22 as in conventional structures, the airflow path is not limited by the size of the trunnion and a larger airflow path can be achieved. Also, since the airflow need not pass through the center of the plurality of guide vanes the multiplicity of seals to effect such air supply through the linkage area required to manipulate the vanes simplifies the heating airflow distribution arrangement.

I claim:

1. A heated inlet variable guide vane assembly for a gas turbine compressor inlet comprising:

an outer casing;

an inner casing, forming an annular airflow passage between said inner and outer casings;

an airfoil having openings therethrough for the passage of heated air, an air inlet end, and having a convex side and a concave side;

a trunnion having an axis and secured to said airfoil at the air inlet end and offset toward the concave side of said airfoil, and rotatably secured in said outer casing;

a second trunnion at the other end of said airfoil coaxial with said first trunnion and rotatably secured to said inner casing;

means for selectably positioning said airfoil around said axis;

a button interposed between said first trunnion and said airfoil, and having a planar surface perpendicular to said axis and facing said first trunnion;

said planar surface having a recess therein in fluid communication with an opening within said airfoil;

a seal on said planar surface surrounding said recess and abutting the inner surface of said outer casing; and an air supply opening located in said outer casing adjacent to said first trunnion, and said recess in fluid communication with said air supply opening.

2. An apparatus as in claim 1:

an elongated slot through the upper portion of said airfoil in fluid communication with said recess; and said recess having a substantially linear edge on the side toward said trunnion and a substantially arcuate outer edge on the side away from said trunnion.

3. An inlet guide vane assembly as in claim 1:

said recess arcuately elongated of a length to remain in fluid communication with said supply openings throughout the rotating range of said airfoil around said trunnion axis.

4. An inlet guide vane assembly as in claim 1:

a streamlined strut joining said outer and inner casings at a location upstream of said airfoil with respect to compressor airflow;

the leading edge of said airfoil located directed behind said strut, and said trunnion circumferentially offset therefrom, whereby said button may be substantially larger than the width of said airfoil without interferring with said strut during installation and said airfoil may still be located close to said strut.

* * * * *